(12) United States Patent
Kidron et al.

(10) Patent No.: US 10,824,292 B2
(45) Date of Patent: Nov. 3, 2020

(54) WIDGET-OF-INTEREST IDENTIFICATION

(71) Applicant: EntIT Software LLC, Sunnyvale, CA (US)

(72) Inventors: Adi Kidron, Tel Aviv (IL); Ofer Spiegel, Yehud (IL); Yael Peisachov, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 138 days.

(21) Appl. No.: 15/874,831

(22) Filed: Jan. 18, 2018

(65) Prior Publication Data

US 2019/0220153 A1 Jul. 18, 2019

(51) Int. Cl.
| | |
|---|---|
| *G06F 3/0481* | (2013.01) |
| *G06F 3/0484* | (2013.01) |
| *G06F 16/28* | (2019.01) |
| *G06F 16/9535* | (2019.01) |
| *G06Q 10/06* | (2012.01) |

(52) U.S. Cl.
CPC ........ *G06F 3/0481* (2013.01); *G06F 3/04842* (2013.01); *G06F 16/287* (2019.01); *G06F 16/9535* (2019.01); *G06Q 10/06393* (2013.01)

(58) Field of Classification Search
CPC .. G06F 3/0481; G06F 16/287; G06F 16/9535; G06F 3/04842
See application file for complete search history.

(56) References Cited

U.S. PATENT DOCUMENTS

| | | | | |
|---|---|---|---|---|
| 7,761,800 | B2* | 7/2010 | Chaudhri | B60K 35/00 715/764 |
| 8,321,801 | B2* | 11/2012 | Chaudhri | G06F 3/0481 715/765 |
| 8,443,291 | B2* | 5/2013 | Ku | G06F 8/38 715/762 |
| 8,903,770 | B2* | 12/2014 | Kucera | H04L 67/306 707/631 |
| 8,924,869 | B2* | 12/2014 | Fellman | G06F 3/0481 715/762 |
| 8,972,873 | B2* | 3/2015 | Gerken, III | G06F 8/38 715/747 |
| 9,110,685 | B2* | 8/2015 | Suryanarayana | G06F 9/451 |
| 9,122,369 | B2* | 9/2015 | Hwang | G06F 3/04817 |
| 9,269,059 | B2* | 2/2016 | Mandyam | G06Q 10/06 |
| 9,285,960 | B2* | 3/2016 | Chmiel | G06Q 10/06 |
| 9,286,413 | B1* | 3/2016 | Coates | G06F 16/903 |

(Continued)

OTHER PUBLICATIONS

Rudolph, et al., "A Joint Model for Who-to-follow and What-to-view Recommendations on Behance", Apr. 11-15, 2016, pp. 581-584. http://www2016.net/proceedings/companion/p581.pdf.

*Primary Examiner* — Jung-Mu T Chuang (57) ABSTRACT

According to examples, an apparatus may include a processor and a non-transitory computer readable medium storing machine readable instructions. The instructions may cause the processor to access a plurality of widgets, in which each of the plurality of widgets includes a data value. The instructions may also cause the processor to identify a widget of the plurality of widgets including a data value that has changed over time by an amount that exceeds a predefined threshold as a widget-of-interest and output a notification regarding a suggestion for the widget-of-interest to be displayed on a user dashboard.

20 Claims, 6 Drawing Sheets

(56) References Cited

U.S. PATENT DOCUMENTS

| | | | | |
|---|---|---|---|---|
| 9,452,678 | B1* | 9/2016 | Boss | B60K 35/00 |
| 9,535,575 | B1* | 1/2017 | Labaj | G06F 16/13 |
| 9,733,916 | B2* | 8/2017 | Wang | G06F 8/54 |
| 9,985,863 | B2* | 5/2018 | Fletcher | G06F 16/903 |
| 10,101,889 | B2* | 10/2018 | Prophete | G06Q 40/12 |
| 2006/0005207 | A1* | 1/2006 | Louch | G06F 8/38 |
| | | | | 719/328 |
| 2006/0150118 | A1* | 7/2006 | Chaudhri | G06F 3/0481 |
| | | | | 715/800 |
| 2007/0038934 | A1* | 2/2007 | Fellman | G06F 3/0481 |
| | | | | 715/700 |
| 2007/0101297 | A1* | 5/2007 | Forstall | G06F 3/04817 |
| | | | | 715/841 |
| 2008/0098290 | A1* | 4/2008 | Williams | G06F 21/51 |
| | | | | 715/209 |
| 2008/0215998 | A1* | 9/2008 | Moore | G06F 9/451 |
| | | | | 715/762 |
| 2008/0222232 | A1* | 9/2008 | Allen | G06F 16/958 |
| | | | | 709/201 |
| 2009/0024944 | A1* | 1/2009 | Louch | G06F 3/04817 |
| | | | | 715/764 |
| 2009/0235149 | A1* | 9/2009 | Frohwein | G06F 16/9535 |
| | | | | 715/205 |
| 2009/0248883 | A1* | 10/2009 | Suryanarayana | G06F 9/451 |
| | | | | 709/229 |
| 2009/0322782 | A1* | 12/2009 | Kimchi | G06Q 30/0201 |
| | | | | 345/619 |
| 2010/0023874 | A1* | 1/2010 | Frohwein | G06F 3/048 |
| | | | | 715/747 |
| 2010/0057646 | A1* | 3/2010 | Martin | G16H 15/00 |
| | | | | 706/11 |
| 2010/0106730 | A1* | 4/2010 | Aminian | G06Q 10/10 |
| | | | | 707/748 |
| 2010/0113148 | A1* | 5/2010 | Haltovsky | A63F 13/26 |
| | | | | 463/30 |
| 2010/0125534 | A1* | 5/2010 | Brandes | G06Q 10/04 |
| | | | | 705/36 R |
| 2010/0131983 | A1 | 5/2010 | Shannon et al. | |
| 2010/0138295 | A1* | 6/2010 | Caron | H04M 1/72583 |
| | | | | 705/14.49 |
| 2011/0119355 | A1* | 5/2011 | Hwang | G06F 9/451 |
| | | | | 709/219 |
| 2011/0167097 | A1* | 7/2011 | Onoda | G06F 17/289 |
| | | | | 707/822 |
| 2011/0239140 | A1* | 9/2011 | Chaudhri | G06F 3/0481 |
| | | | | 715/760 |
| 2012/0096429 | A1* | 4/2012 | Desai | G06F 8/34 |
| | | | | 717/107 |
| 2012/0101952 | A1* | 4/2012 | Raleigh | G06Q 30/016 |
| | | | | 705/304 |
| 2013/0174063 | A1* | 7/2013 | Chmiel | G06F 3/0484 |
| | | | | 715/762 |
| 2013/0185122 | A1* | 7/2013 | Smadja | G06Q 30/0217 |
| | | | | 705/12 |
| 2013/0262355 | A1* | 10/2013 | Treiser | G06N 20/00 |
| | | | | 706/12 |
| 2014/0156645 | A1* | 6/2014 | Brust | G06F 16/435 |
| | | | | 707/722 |
| 2014/0164359 | A1* | 6/2014 | Jeffery | G06F 17/212 |
| | | | | 707/722 |
| 2015/0113451 | A1* | 4/2015 | Kopp | G06Q 10/10 |
| | | | | 715/764 |
| 2015/0294532 | A1* | 10/2015 | Walker | G07F 17/32 |
| | | | | 463/25 |
| 2016/0026762 | A1 | 1/2016 | Radhakrishnan et al. | |
| 2016/0103592 | A1* | 4/2016 | Prophete | G06F 3/04845 |
| | | | | 715/771 |
| 2016/0105338 | A1* | 4/2016 | Fletcher | H04L 43/16 |
| | | | | 709/224 |
| 2016/0179359 | A1* | 6/2016 | Kodejs | G06F 3/0481 |
| | | | | 715/763 |
| 2016/0188145 | A1 | 6/2016 | Vida et al. | |
| 2016/0246490 | A1* | 8/2016 | Cabral | G06F 9/451 |
| 2016/0255474 | A1* | 9/2016 | Issa | H04W 4/029 |
| | | | | 455/456.3 |
| 2016/0373588 | A1* | 12/2016 | Raleigh | H04M 15/83 |
| 2017/0136877 | A1* | 5/2017 | Boss | B60K 35/00 |
| 2017/0192648 | A1* | 7/2017 | Abedin | G06Q 10/06393 |
| 2017/0329933 | A1* | 11/2017 | Brust | G06F 19/3418 |
| 2018/0024901 | A1* | 1/2018 | Tankersley | G06F 16/2379 |
| | | | | 707/694 |
| 2018/0129989 | A1* | 5/2018 | Bowers | G06Q 10/0635 |
| 2018/0165767 | A1* | 6/2018 | Faherty | G06Q 10/063114 |
| 2019/0095478 | A1* | 3/2019 | Tankersley | G06F 11/3006 |
| 2019/0220153 | A1* | 7/2019 | Kidron | G06F 3/0481 |
| 2019/0260879 | A1* | 8/2019 | Raleigh | H04M 15/66 |

\* cited by examiner

WIDGET-OF-INTEREST IDENTIFICATION

BACKGROUND

Coherent presentation of information may help in conducting work today. With the vast amount of information available, enterprises are seeking different ways to present data efficiently. Dashboards provide at-a-glance views of key performance indicators that are relevant to a particular objective or process. Specifically; dashboards include widgets that display the performance indicators to allow users to access information or perform a function.

BRIEF DESCRIPTION OF THE DRAWINGS

Features of the present disclosure are illustrated by way of example and not limited to the following Figure(s), in which like numerals indicate like elements.

DETAILED DESCRIPTION

For simplicity and illustrative purposes, the present disclosure is described by reference to an example. In the following description, numerous details are set forth in order to provide an understanding of the present disclosure. However, the present disclosure may be practiced without limitation to these details. As used herein, the terms "a" and "an" are intended to denote at least one of a particular element, the term "includes" means includes but not limited to, the term "including" means including but not limited to, and the term "based on" means based at least in part on.

As used herein, the terms, first, second, third, etc., are used to distinguish elements with respect to each other and are not intended to be construed as conveying a particular order of operations.

Unstructured data may be created during analytics and processing of documents. This unstructured data may be refined and put in a specific format and order before being presented. However, the increased availability of unstructured data may create a hindrance in identifying variables and relationships between those variables. For example, the unstructured data may be very large, e.g., may include terabytes of data. As a result, identification of relationships in the unstructured data for visualization of information may become cumbersome. In the absence of any identified relationship in the unstructured data, display of the unstructured data to a user may not be useful.

In order to efficiently present the information contained within the unstructured data, enterprises may create dashboards to provide information to its users. Users may, in turn, populate the dashboards with various widgets to be able to efficiently manage various operations of the enterprise. A widget is an element on a dashboard that displays data. Some widgets may come preconfigured with a system whereas other widgets may be created from scratch. Yet other widgets may be customized per a user's needs. The widgets may facilitate interaction between users and an operating system or an application.

Various users may create widgets repeatedly and for multiple applications. This may cause computing devices to consume more power and may also increase processor utilization, thereby resulting in a reduction in battery life of the computing devices that are displaying the widgets. Moreover, there may be scenarios where one user may wish to use a widget similar to a specific widget on a dashboard of another user. As the two users may have access to different sets of data, creation of similar widgets based on different variables may be inconvenient.

Various implementations of the present disclosure may disclose a widget creator based on machine learning. The widget creator, disclosed herein as a processor and a set of machine readable instructions on a computer readable storage medium, may scan unstructured data and search for a widget having specified properties from among a plurality of stored widgets. Based on the scanning, the widget creator may suggest such a widget to a user.

For example, the widget creator may analyze the unstructured data on a predetermined recurring schedule, e.g. on a daily basis, on a weekly basis, on a monthly basis, or the like. Based on the analysis, the widget creator may determine any changes, e.g., any unexpected change in a certain data set or more usage of a specific type of data amongst the users of the enterprise. Based on such an analysis, the widget creator may output a widget-of-interest to a user to be displayed on a user dashboard.

The user may accept or reject the recommended widget-of-interest. The widget creator may also determine whether the user has added the widget-of-interest to the user's dashboard or not. The widget creator may further learn a user's behavior or requirements, based on such determination and may accordingly suggest other widgets to the user.

In an example implementation of the present disclosure, a processor may identify variables within the unstructured data. Based on the identification of the variables, the processor may identify a plurality of relationships between the variables within the unstructured data. For each of the plurality of relationships, a value may be determined by the processor. Further, the processor may identify those relationships for which the values change at different periods of time. In an example, the changes exhibited may be above a pre-defined threshold. Based on the identified relationships, the processor may output an indication to a user to access a widget, the widget being indicative of an identified relationship from the identified relationships.

In another example implementation, the processor may identify variables in a data set associated with a first user dashboard. The processor may also determine a plurality of relationships between the identified variables in the unstructured data for use in the widget created by the first user. Furthermore, the processor may identify relationships between variables in the unstructured data that exhibit changes at different periods of time as represented in the widget created by the first user. In an example, the changes exhibited may be above a pre-defined threshold. Based on the identification of the variables that exhibit changes, the processor may suggest, to a second user, a second widget that displays the relationship graphically in the widget created by the first user.

Accordingly, the processor disclosed herein may monitor data to determine various options of widgets and may identify the widgets to suggest to users based on changes in values of variables in each relationship among a plurality of relationships at different points in time. Furthermore, the processor may compare a widget-of-interest in different historical timeframes to identify trends and abnormalities.

Figure 1A:
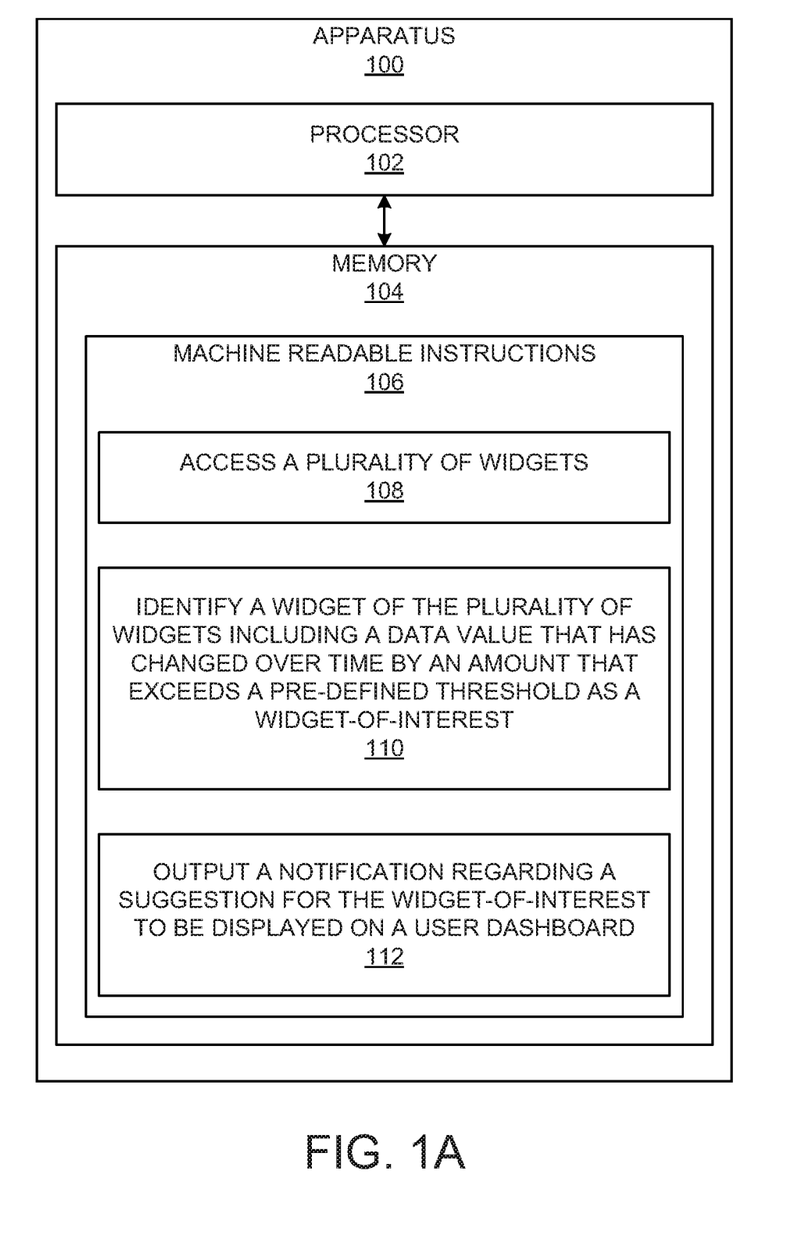
FIG. 1A illustrates a block diagram of an example apparatus for widget-of-interest identification.

Reference is first made to FIGS. 1A-10. FIG. 1A illustrates a block diagram of an example apparatus 100 for widget-of-interest identification, FIG. 1B illustrates a block diagram of an example pool of widgets 120, and FIG. 10 illustrates a block diagram of an example user display 130 on which a user dashboard 140 may be displayed. The apparatus 100, which may be a computing device, a server computer, or the like, may also identify a widget that a user has added to a dashboard. The apparatus 100 may include additional components and one or more of the components described herein may be removed and/or modified without departing from a scope of the apparatus 100. For example, the components of the apparatus 100 are shown as being on a single computing device or server as an example, and in other examples, the components may be provided on multiple computers or servers.

The apparatus 100 may include a processor 102 and a memory 104 that stores machine readable instructions 106 that the processor 102 may execute. The processor 102, which may be a microprocessor, a micro-controller, an application specific integrated circuit (ASIC), a graphical processing unit, or the like, may perform various processing functions in the apparatus 100. The processing functions that the processor 102 performs, and other functions, operations and methods described herein may be embodied in the machine readable instructions 106. In addition to storing the machine readable instructions 106, the memory 104 may store data or functions. In addition, or in other examples, the apparatus 100 may include multiple processors, a multiple core processor, a plurality of multiple core processors, or the like. The apparatus 100 may also include multiple memories. As such, the apparatus 100 is described as including a single processor 102 and a single memory 104 for purposes of simplicity.

As shown in FIG. 1A, the machine readable instructions 106 may store instructions 108 that may cause the processor 102 to access a plurality of widgets 122-1 to 122-n, in which the variable "n" may represent a value greater than one. The instructions 108 may cause the processor 102 to access a plurality of widgets 122-1 to 122-n in a widget pool 120 shown in FIG. 1B. The widget pool 120 may represent a pool of widgets 122-1 to 122-n that may each correspond to a data value 124-1 to 124-n. Each of the data values 124-1 to 124n may be a numeric value and may graphically be represented in a corresponding widget 122-1 to 122-n. The widgets 122-1 to 122-n may display the data values 124-1 to 124-n as graphical representations of the data values 124-1 to 124-n to make the data values 124-1 to 124-n readily and easily understandable. In examples, the processor 102 may access widgets 122-1 to 122-n pertaining to different data types.

Figure 1B:
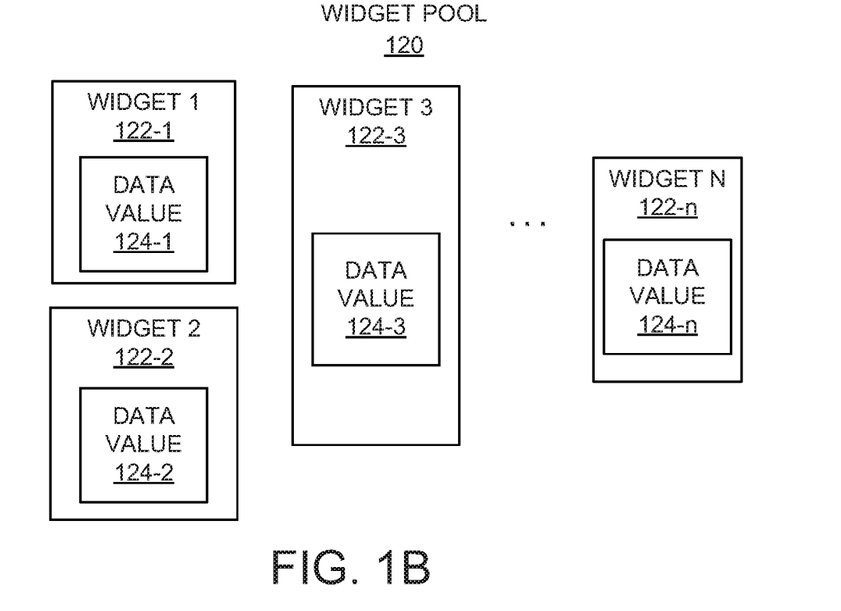
FIG. 1B illustrates a block diagram of an example pool of widgets.

For instance, some or all of the widgets 122-1 to 122-n may include or display data values 124-1 to 124-n as graphical representations of the data values 124-1 to 124-n. By way of particular example, the graphical representations may include a bar graph representing different temperature values, in which each bar may correspond to a temperature reading. In another example, the graphical representations may include a pie graph representing different allocations of CPU utilization in percentages, in which each segment of the pie graph may correspond to an amount of CPU utilization in percentage. One of ordinary skill in the art will appreciate that any value associated with data a widget represents may be a data value associated with that widget.

Furthermore, the machine readable instructions 106 may store instructions 110 that may cause the processor 102 to identify a widget 122-1 from the plurality of widgets 122-1 to 122-n including a data value 124-1 that has changed over time by an amount that exceeds a pre-defined threshold. In examples, a user may define the pre-defined threshold, the pre-defined threshold may be defined by an administrator, or the like. In examples, if the user has defined the threshold to be 20% and the change in the data value 124-1 is more than 20%, the processor 102 may store such changes in the data values 124-1 of the widget 122-1. In addition, the processor 102 may identify the widget 122-1 as a widget-of-interest.

In implementations, the processor 102 may scan the widgets 122-1 to 122-n in the widget pool 120 to identify anomalies in the data values 124-1 to 124-n corresponding to the widgets 122-1 to 122-n. For example, the processor 102 may perform historical trend analysis to identify the anomalies in the data values 124-1 to 124-n, e.g., the processor 102 may determine that the data values 124-1 including a first widget 122-1 contain an anomaly based on the data value 124-1 changing by an amount greater than anticipated. In an example in which the data values 124-1 included in the first widget 122-1 tracks CPU utilization of a server, the processor 102 may determine that the data values 124-1 contain an anomaly if a spike in the CPU utilization is identified. In another example, the processor 102 may compare a current data value 124-1 included in the first widget 122-1 with a previous data value 124-1 of the first widget 122-1 to determine if there has been any change in the data value 124-1. Based on the scanning and analysis, the processor 102 may identify the first widget 122-1 as a widget-of-interest.

Figure 1C:
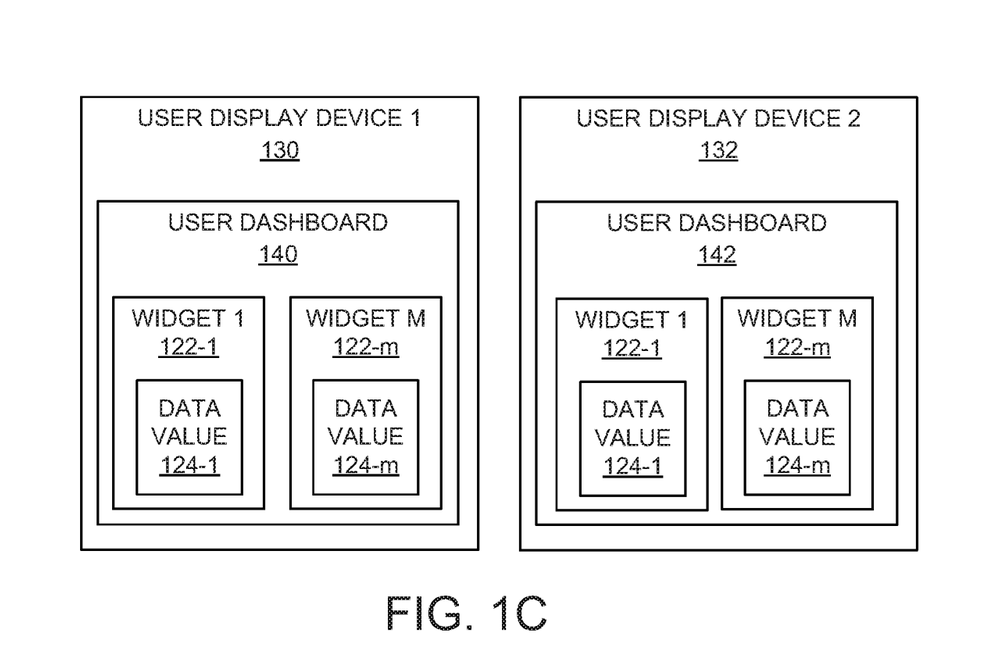
FIG. 1C illustrates a block diagram of an example user display on which a user dashboard may be displayed.

The machine readable instructions 106 may store instructions 112 that may cause the processor 102 to output a notification regarding a suggestion for the widget-of-interest (e.g., first widget 122-1) to be displayed on a dashboard of a user. For instance, the notification may be indicative of a suggestion provided by the processor 102 to the user to include the first widget 122-1 on the user dashboard 140 such that the first widget 122-1 is displayed on the user dashboard 140 of a user display device 130. In an example, the processor 102 may output the notification by displaying an icon with the first widget 122-1 on the user display device 130. In another example, the processor 102 may output the notification by providing a message regarding the first widget 122-1, e.g., may provide a pop-up message, may provide a text message, may provide an alert regarding the first widget 122-1, or the like. In any of these examples, the notification may include an option for the user to add the first widget 122-1 to the user dashboard 140.

In examples, the processor 102 may determine whether the user has added the identified widget-of-interest (e.g., the first widget 122-1) to the user dashboard 140 or not. Based on a determination that the user has added the widget-of-interest 122-1 to the user dashboard 140, the processor 102 may identify a feature corresponding to the widget-of-interest 122-1. A feature corresponding to the widget-of-interest 122-1 may be defined as an attribute, a topic, a type, etc., of the data values 124-1 included in the widget 122-1. As an example in which the data values 124-1 pertain to values associated with the performance of members of a particular team, the feature may be defined as the performance of the team members. In this example, the processor 102 may identify the feature corresponding to the widget-of-interest 122-1 as being the performance of the team members.

In addition, the processor 102 may identify another widget 122-2 that corresponds to data values 124-2 that is also associated with the identified feature. Thus, for instance, in keeping with the example discussed above, the processor 102 may identify the other widgets 122-2 based on the data values 124-2 being associated with the performance of the team members. In any regard, the processor 102 may output a notification to recommend the identified other widget 122-2 that corresponds to the data values 124-2 associated with the identified feature to the user. That is, the processor 102 may cause the other widget 122-2 to be displayed on the user display device 130, may cause an alert or other notification to be displayed on the user display device 130, or the like. In this regard, the processor 102 may recommend another widget 122-2 that may be of particular interest to the user as the other widgets 122-2 may correspond to the same or similar feature as the widget-of-interest 122-1 that the user has included in the user dashboard 140.

In example implementations, the processor 102 may determine that the user belongs to a class of users that use widgets 122-1 to 122-n with the identified feature. The processor 102 may, based on the determination that the user belongs to the class of users that uses widgets 122-1 to 122-n with the identified feature, select the identified feature. For example, one team in an organization may be dedicated towards a certain type of work or data items and, therefore, may use widgets 122-1 to 122-n with features that pertain to that type of work or data items. The processor 102 may determine whether the user belongs to any such team. Based on the determination that the user belongs to such a team, the processor 102 may select the feature for which the widget 122-1 has been created and added to the user dashboard 140. The processor 102 may identify another widget 122-2 that includes the selected feature. The processor 102 may also recommend the identified widget 122-2 that includes the selected feature to the user as discussed above.

In examples, the processor 102 may output the notification to suggest a predetermined number of widgets 122-1 to 122-n (e.g., 2-3 widgets) to the user on a predetermined recurring schedule, e.g., on a daily basis. As part of the notification, the processor 102 may also provide the user with details as to why the widgets 122-1 to 122-n are suggested. In the event the user accepts the suggested widgets 122-1 to 122-n, the suggested widgets 122-1 to 122-n may be added to the user dashboard 140. In the example shown in FIG. 10, the user has added the first widget 122-1 to the user dashboard 140, which may also display an existing widget 122-m.

On the other hand, based on a determination that the user did not add the widget-of-interest 122-1 to the user dashboard 140, the processor 102 may classify the user in a category of users who did not add the widget-of-interest 122-1 to the user dashboard 140. The processor 102 may employ machine learning techniques to classify the user into such a category. In addition, the processor 102 may determine that the user was not interested in or did not find the widget-of-interest 122-1 as being relevant to the user. Based on the machine learning techniques, the processor 102 may also learn about the user's interests and may recommend widgets-of-interest 122-1 to 122-n according to the learned user's requirements.

In implementations, the processor 102 may determine that the user did not add the widget-of-interest 122-1 to the user dashboard 140. Based on this determination, the processor 102 may classify the widget-of-interest 122-1 in a category of widgets that were presented to a user but that the user did not add the widget-of-interest 122-1 to the user dashboard 140. The processor 102 may track which of the widgets 122-1 to 122-n that were presented to users were added to the user dashboard 140. The processor 102 may also use this information to determine which of the widgets 122-1 to 122-n to recommend to the users. For instance, even when a widget 122-1 is deemed to be of interest, e.g., corresponds to a data value 124-1 that has changed beyond a predefined threshold, the processor 102 may not recommend the widget 122-1 to a user if the processor 102 determines that the widget 122-1 was previously presented to users and that a majority of the users did not add the widget 122-1 to their dashboards.

In implementations, the processor 102 may determine if the user added the widget-of-interest 122-1 to the user dashboard 140 within a certain time period. Based on a determination that the user or a plurality of users, e.g., a majority of the users, a number of users that exceed a predefined percentage, etc., added the widget-of-interest 122-1 to the respective user dashboards 140 within the certain time period, the processor 102 may select the widget-of-interest 122-1 to recommend to other users. By way of example in which the processor 102 recommends or suggests a widget-of-interest 122-1 to a user and the user adds the recommended widget-of-interest 122-1 within five minutes of receipt of the recommendation, the processor 102 may select the widget-of-interest 122-1 to be recommended to other users. Addition of the widget-of-interest 122-1 within a certain time period may indicate that the widget-of-interest 122-1 is useful and/or relevant to the user. Moreover, such identification may facilitate the monitoring of the accuracy of the recommendations of widgets 122-1 to 122-n to other users. For example, the processor 102 may suggest the same widget-of-interest 122-1 to other members in the user's team for addition to their dashboards.

The processor 102 may receive feedback from the user to whom the notification regarding the suggestion for the widget-of-interest 122-1 has been output. Based on the feedback received from the user, the processor 102 may manage the recommendations for other widgets 122-1 to 122-n provided to the user. For example, if a user provides positive feedback about a widget-of-interest 122-1, the processor 102 may recommend the same widget 122-1 to other personnel in the user's team. Accordingly, the processor 102 may continuously scan the widgets 122-1 to 122-n to track which of the widgets 122-1 to 122-n are added to the user dashboards. Based on the scans, the processor 102 may recommend certain ones of the widgets 122-1 to 122-n to other users.

Figure 2:
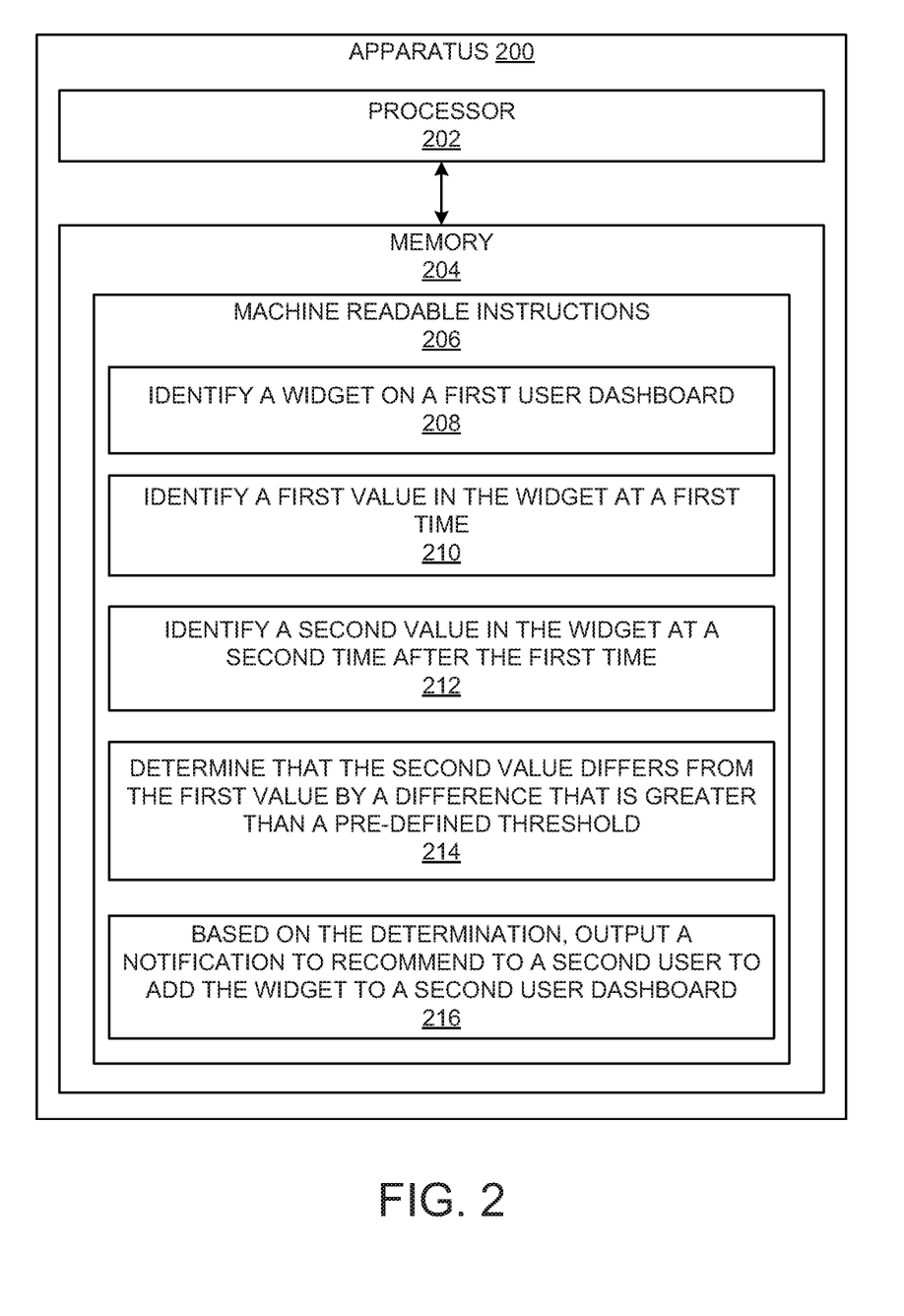
FIG. 2 illustrates another block diagram of an example apparatus for widget suggestion, e.g., for identifying a widget based on a change in a data value included in the widget.

Turning now to FIG. 2, there is illustrated a block diagram of an example apparatus 200 for widget suggestion, e.g., for identifying a widget based on a change in a data value included in the widget. The apparatus 200, which may be a computing device, a server computer, or the like, may also identify a feature based on a determination as to whether a user has added the widget to the user's dashboard. The description of the apparatus 200 is made with reference to the elements shown in FIGS. 1B and 10.

The apparatus 200 may include additional components and one or more of the components described herein may be removed and/or modified without departing from a scope of the apparatus 200. For instance, the components of the apparatus 200 are shown as being on a single computing device or server as an example, and in other examples, the components may be provided on multiple computers or servers. In addition, or in other examples, the apparatus 200 may include multiple processors, a multiple core processor, a plurality of multiple core processors, or the like. The apparatus 200 may also include multiple memories. As such, the apparatus 200 is described as including a single processor 202 and a single memory 204 as a non-limiting example.

The apparatus 200 may include a processor 202 and a memory 204 that stores machine readable instructions 206 that the processor 202 may execute. The processor 202, which may be a microprocessor, a micro-controller, an application specific integrated circuit (ASIC), a graphical processing unit, or the like, may perform various processing functions in the apparatus 200. The processing functions that the processor 202 performs, and other functions, operations and methods described herein may be embodied in the machine-readable instructions 206. In addition to storing the machine readable instructions 206, the memory 204 may store data or functions.

As shown in FIG. 2, the machine readable instructions 206 may store instructions 208 that may cause the processor 202 to identify a widget 122-m on a first user dashboard 130. By way of particular example, a first user may be an employee of an organization or member of a team working on a project. The machine readable instructions 206 may also store instructions 210 that may cause the processor 202 to identify a first data value 124-m of the widget 122-m at a first time. The first data value 124-m may correspond to a feature for which the first user has added the widget 122-m to the first user dashboard 130. By way of particular example, the first data value 122-m may pertain to performance of team members, work progress status, pipeline status, attendance of team members, or the like.

Further, the machine readable instructions 206 may store instructions 212 that may cause the processor 202 to identify a second data value 124-m of the widget 122-m at a second time after the first time. In examples, the processor 202 may identify the change in data value 124-m having a periodic nature. For example, the processor 202 may monitor the identified feature on a regular basis, such as hourly, daily, weekly, and so on. Furthermore, the machine readable instructions 206 may store instructions 214 that may cause the processor 202 to determine that the second data value 124-m of the feature differs from the first data value 124-m by a difference that is greater than a pre-defined threshold. In particular examples, a user may define the pre-defined threshold, an administrator may define the pre-defined threshold, the pre-defined threshold may vary depending upon the features to which the data values pertain, or the like. By way of particular example, the pre-defined threshold may be set to be about 20%.

The machine readable instructions 206 may further store instructions 216 to, based on a determination that the difference between the first data value 124-m and the second data value 124-m is greater than the predefined threshold, cause the processor 102 to output a notification to recommend to a second user to add the widget 122-m to a second user dashboard 142. For example, the processor 102 may output the notification to the second user when there is an unexpected spike or change in the data value 124-m of the feature as compared to the last monitored data value 124-m of the feature. Such anomalies in the data value 124-m may indicate that the widget 122-m, may be of use to and/or may be relevant to the second user.

The notification may be indicative of a suggestion provided by the processor 102 to the second user to include the widget 122-m on the second user dashboard 142 such that the widget 122-m is displayed on the second user dashboard 142 of a second user display device 132. In an example, the processor 102 may output the notification by displaying an icon with the widget 122-m on the second user display device 132. In another example, the processor 102 may output the notification by providing a message regarding the widget 122-m, e.g., may provide a pop-up message, may provide a text message, may provide an alert regarding the widget 122-m, or the like. In any of these examples, the notification may include an option for the second user to add the widget 122-m to the second user dashboard 142.

In examples, to output the notification to recommend to the second user to add the widget 124-m, the processor 202 may identify variables in a data set associated with the first user dashboard 140. The processor 202 may determine a plurality of relationships between the identified variables with respect to each other. The processor 202 may also determine data values corresponding to each of the plurality of relationships. Based on the determination, the processor 202 may identify relationships from the plurality of relationships having changes in the data values within the pre-defined threshold at different points in time. Furthermore, based on the identification of the relationships, the processor 202 may output the notification to recommend to the second user to add the widget 122-m. The widget 122-m may be indicative of an identified relationship from the identified relationships.

In addition, for each of the identified relationships having data values that change at the different points in time, and are within the pre-defined threshold, the processor 202 may suggest an alternative widget representing the identified relationship between the identified variables corresponding to the identified relationships to users.

In example implementations, the processor 202 may receive feedback from the second user regarding the recommended widget 122-m. Based on the received feedback, the processor 202 may determine a set of relationships among the generated plurality of relationships that correspond to a relationship represented by the recommended widget 122-m. The threshold for determining whether the relationships correspond with each other may be based upon a degree of closeness among the relationships, which, for instance, may be set by a user or an administrator responsible for configuring the apparatus 200. Furthermore, the processor 202 may, based on the determination, output a notification for the first user to access other widgets 122-1 to 122-n based on the set of relationships. The processor 202 may also identify widgets 122-1 to 122-n that represent relationships that are either identical or close to the set of relationships determined based on the feedback from the second user.

For example, a user may provide feedback indicating that a widget 122-1 corresponding to the Central Processing Unit (CPU) utilization of a subsystem is related to overall system performance of a system including the subsystem. Based on this feedback, the processor 202 may determine other widgets 122-2 to 122-n that correspond to data values 124-1 associated with the performance of other subsystems within the system. In order to determine the identities of the related subsystems, the processor 202 may use information entered by a user or an administrator of the apparatus 200. This information may be entered, for example, by tagging a subsystem to annotate to what overall system the tagged subsystem may belong. One of ordinary skill in the art will appreciate that other techniques may also be used by a user/administrator to set a threshold for determining the degree of closeness between relationships represented by the widgets 122-1 to 122-n.

Figure 3:
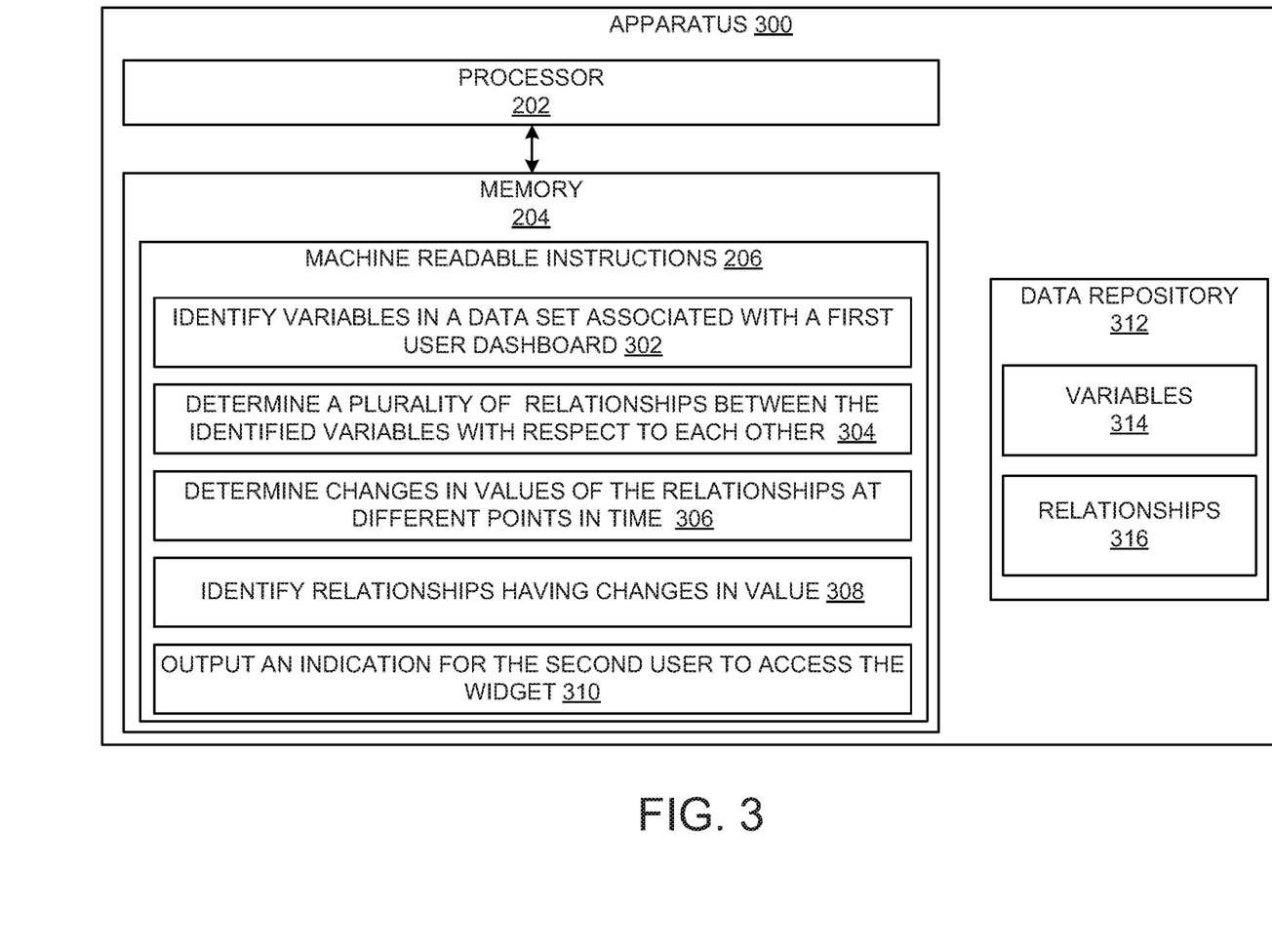
FIG. 3 illustrates another block diagram of an example apparatus for widget suggestion.

Referring to FIG. 3, another block diagram of an example apparatus 300 for widget suggestion is illustrated. The example apparatus 300 depicted in FIG. 3 may include additional or fewer components than the ones described herein without departing from a scope of the present disclosure. As shown in FIG. 3, the apparatus 300 may include the processor 202, the memory 204, and the machine readable instructions 206 discussed with respect to FIG. 2. The memory 204 may also be used to store data generated by the processor 202. The description of the apparatus 300 is made with reference to the elements shown in FIGS. 1B and 1C.

The processor 202 may execute the machine readable instructions 302 to identify variables in a data set associated with the first user dashboard 140. Further, the processor 202 may execute the machine readable instructions 304 to determine a plurality of relationships between the identified variables with respect to each other. Once the plurality of relationships is determined between the identified variables with respect to each other, values corresponding to each of the plurality of relationships may be determined. In addition, the processor 202 may execute the machine readable instructions 306 to determine changes in the values of the plurality of relationships at different points in time.

In examples, the changes in the values of the plurality of relationships may be determined on a daily basis, a weekly basis, a monthly basis, or the like. Accordingly, at different points in time, the processor 202 may determine an extent of changes for the plurality of relationships. Based on the determined changes, the processor 202 may execute the machine readable instructions 308 to identify relationships from the plurality of relationships having changes in value. For example, the processor 202 may identify those relationships for which the changes in the values are within a pre-defined threshold. In any regard, the processor 202 may generate a widget 124-$m$ that may be indicative of an identified relationship.

Further, the processor 202 may execute the machine readable instructions 310 to output an indication for the second user to access the widget 124-$m$. In examples, the processor 202 may output the indication by displaying an icon with the widget 124-$m$ on the second user display device 132. In other examples, the processor 202 may output the indication by providing a notification regarding the widget 124-$m$ on the second user display device 132. In another example, the processor 202 may output a widget 124-$m$ representing the identified relationship between the identified variables for each of the identified relationships having values that have changed at the different points in time and are within the pre-defined threshold.

In example implementations, the apparatus 300 may include a data repository 312 that stores data used by the processor 202. The data repository 312, for example, may store data pertaining to the variables 314 that the processor 202 may have identified from a data set. Furthermore, the data repository 312 may store the relationships 316 between the variables with respect to each other that the processor 202 may have identified.

Figure 4:
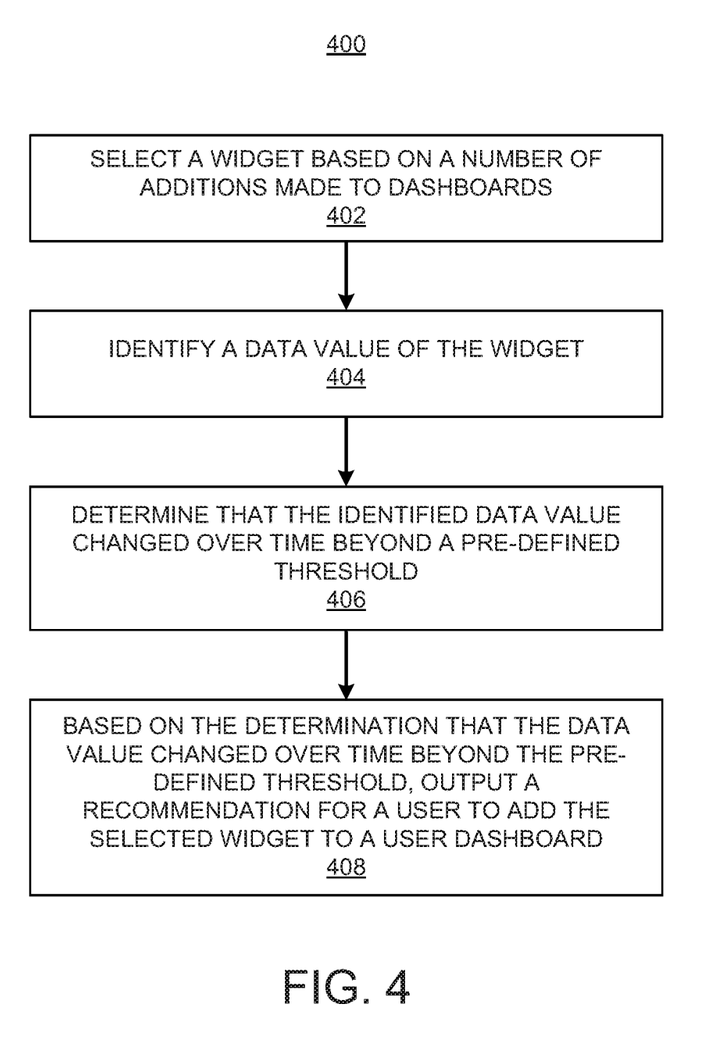
FIG. 4 illustrates a flow chart of an example method of suggesting a widget.

FIG. 4 illustrates a flow chart of an example method 400 of suggesting a widget. The processor 102, 202 may execute the method 400 and other methods described herein. For example, the processor 102, 202 shown in FIGS. 1A through 3 may execute some or all of the machine readable instructions 106, 206 to execute the method 400. Although particular reference is made herein to the processor 102, 202 executing the method 400, another device or multiple devices may execute the method 400 without departing from the scope of the method 400.

At block 402, the processor 102, 202 may select a widget 122-1 based on a number of additions of the widget 122-1 to dashboards 140, 142. For example, the processor 102, 202 may identify a widget 122-1 that users may have added to their personal dashboards 140, 142. Identification of the widget 122-1 may include identification of variables in the widget 122-1 created by a first user. Based on the identification, the processor 102, 202 may determine a common set of widgets 122-1 that are added to the dashboards. In examples, the widget 122-1 may be an element on a dashboard that displays data values and the variables in the widget 122-1 may belong to a set of variables in a data set.

At block 404, the processor 102, 202 may identify a feature of the selected widget 122-1. As discussed above, a feature of the selected widget 122-1 may be defined as an attribute, a topic, a type, etc., of the data values 124-1 included in the widget 122-1.

At block 406, the processor 102, 202 may, based on the identification at block 404, determine that a data value 124-1 of the feature has changed over time beyond a pre-defined threshold. Based on a determination that the data value 124-1 has changed over time beyond the pre-defined threshold, the method 400 may move to block 408. By way of particular example, the pre-defined threshold may be set at around 20%.

At block 408, the processor 102, 202 may, based on a determination that the change in data value 124-1 of the feature of the widget 122-1 is greater than the pre-defined threshold, output an indication for a user to access the widget 122-1. For instance, the indication may be a suggestion to the user to include the widget 122-1 on the user dashboard 140 such that the first widget 122-1 is displayed on the user dashboard 140 of a user display device 130. The processor 102, 202 may output the notification in any of the manners discussed herein.

The user may find the widget 122-1 to be relevant and may add the widget 122-1 to the user dashboard 140. However, the user may find the widget 122-1 to be irrelevant and may not add the widget 122-1 to the user dashboard 140, in which case the user may discard the indication, which may equivalently be construed as a notification. Additionally, the processor 102, 202 may determine whether the user has added the suggested widget 122-1 to the user dashboard 140. Based on a determination that the user did not add the suggested widget 122-1 to the user dashboard 140, the processor 102, 202 may classify the user in a category of users who did not add the widget 122-1 to their respective user dashboards. Alternately, or in addition, based on the determination that the user did not add the suggested widget 122-1 to the user dashboard 140, the processor 102, 202 may classify the suggested widget 122-1 in a category of widgets that were presented but were not added to the users' dashboards.

In the method 400, the processor 102, 202 may further substitute identified data values with other data values in the data set to generate a plurality of relationships between the identified data values and other data values in the data set. Based on the substitution, the processor 102, 202 may determine a difference between each of the substituted data values expressed in each generated relationship, at different points in time. Based on the difference between values of each of the substituted data values, the processor 102, 202 may determine whether the difference is within a pre-defined threshold. Based on a determination that the difference is within the pre-defined threshold, the processor 102, 202 may suggest a widget graphically representing a relationship between the substituted data values in the widget.

In addition, the processor 102, 202 may determine a difference between values of each of the identified variables expressed in the widget 122-1 at different points in time. Based on the difference between the values of each of the identified data values, the processor 102, 202 may determine whether the difference between the values is within a pre-defined threshold. Based on a determination that the values of the same data value expressed at different points in time is within the pre-defined threshold, the processor 102, 202 may suggest a widget 122-1 representing the relationship between the identified data values in the widget to a second user.

Figure 5:
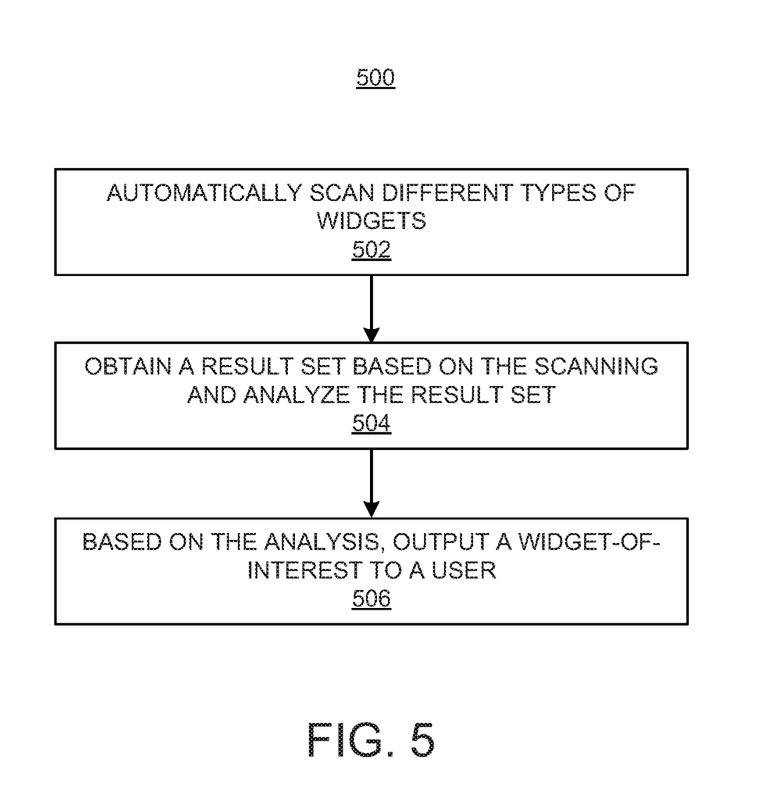
FIG. 5 illustrates a flow chart of another example method of suggesting a widget.

FIG. 5 illustrates a flow chart of another example method 500 of suggesting a widget. The processor 102, 202 may execute the method 500 and other methods described herein. For example, the processor 102, 202 shown in FIGS. 1A through 3 may execute the machine readable instructions 106, 206 to execute the method 500. Although particular reference is made herein to the processor 102 executing the method 500, another device or multiple devices may execute the method 500 without departing from the scope of the method 500.

At block 502, the processor 102, 202 may automatically scan different types of widgets 122-1 to 122-n. The different widget types may be indicative of different types of features that are represented by the corresponding widgets. The processor 102, 202 may apply various techniques to perform a scan of the different types of widgets 122-1 to 122-n. For instance, the processor 102, 202 may apply various filters while scanning the different types of widgets 122-1 to 122-n. The filters may, for example, enable scanning of the widgets 122-1 to 122-n based on the types of data the widgets 122-1 to 122-n may represent. These may include, for example, team wise data, month wise data, and other such data types. As a result of the scanning, the processor 102, 202 may, obtain a result set. The result set may include a subset of the widgets 122-1 to 122-n scanned that were obtained after applying the appropriate filters.

At block 504, the processor 102, 202 may perform analysis of the result set. The processor 102, 202 may employ different analysis techniques to perform the analysis. For example, the processor 102, 202 may compare the current data value for each widget 122-1 to 122-n with a past data value of that widget 122-1 to 122-n. Further, the processor 102, 202 may determine if the difference between the two exceeds a pre-defined threshold, which may indicate an anomaly. As a result of the analysis, if it is determined that the difference between the two data values associated with a widget 122-1 exceeds a pre-defined threshold, the processor 102, 202 may identify the widget 122-1 as a widget-of-interest.

At block 506, the processor 102, 202 may output the widget-of-interest 122-1 to a user. For instance, the output may be indicative of a suggestion provided by the processor 102, 202 to the user. In examples, the processor 102 may output the widget-of-interest 122-1 by causing an icon with the widget-of-interest 122-1 to be displayed on a user display device 130. In examples, the processor 102, 202, may output the widget-of-interest by providing a notification regarding the widget-of-interest 122-1. Furthermore, the output may include an option of adding the widget-of-interest 122-1 to the user dashboard 140.

In examples, the user may provide feedback regarding the suggested widget-of-interest 122-1. Based on the feedback received from the user, the processor 102, 202 may manage recommendations of the widgets 122-1 to 122-n provided to the user as well as to other users as discussed herein.

Some or all of the operations set forth in the methods 400 and 500 may be included as utilities, programs, or subprograms, in any desired computer accessible medium. In addition, the methods 400 and 500 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein are examples of the disclosure along with some variations. The terms, descriptions, and figures used herein are set forth by way of illustration only and are not meant as limitations. Many variations are possible within the scope of the disclosure, which are intended to be defined by the following claims and their equivalents in which all terms are meant in their broadest reasonable sense unless otherwise indicated.

We claim:

1. An apparatus comprising:
   a processor; and
   a non-transitory computer readable medium storing machine readable instructions that when executed by the processor cause the processor to:
   access a plurality of widgets, wherein each widget of the plurality of widgets includes at least one data value displayed as a graphical representation on the widget;
   identify data values in a first widget of the plurality of widgets;
   substitute the data values in the first widget with other data values in a data set;
   determine a difference between values of each of the substituted data values at different points in time; and
   in response to a determination that the difference between the values of each of the substituted data values at the different points in time is within a pre-defined threshold, output a recommendation to add a second widget that graphically represents a relationship between the substituted data values in the first widget on a user dashboard.

2. The apparatus as claimed in claim 1, wherein the machine readable instructions that when executed by the processor further cause the processor to:
   identify a third widget of the plurality of widgets that includes a numeric data value that has changed over time by an amount that exceeds a second pre-defined threshold as a widget-of-interest;
   output a recommendation to add the widget-of-interest to the user dashboard;
   determine whether the widget-of-interest is added to the user dashboard; and
   based on a determination that the widget-of-interest is not added to the user dashboard, classify the widget-ofinterest in a category of widgets that were presented to a user but not added to the user dashboard.

3. The apparatus as claimed in claim 2, wherein the machine readable instructions further cause the processor to:
based on the determination that the widget-of-interest is not added to the user dashboard, classify the user in a category of users who did not add the widget-of-interest to their respective dashboards.

4. The apparatus as claimed in claim 2, wherein the machine readable instructions further cause the processor to:
based on an acceptance of the recommendation to add the widget-of-interest to the user dashboard, add the widget-of-interest to the user dashboard.

5. The apparatus as claimed in claim 2, wherein the machine readable instructions that when executed by the processor further cause the processor to:
based on a determination that the widget-of-interest is added to the user dashboard, identify a feature of the numeric data value included in the widget-of-interest;
identify another widget that includes the identified feature of the numeric data value; and
output a recommendation for the other widget to be added to the user dashboard.

6. The apparatus as claimed in claim 2, wherein the machine readable instructions that when executed by the processor further cause the processor to:
determine that the user belongs to a class of users, the class of users having widgets with a feature on the users' dashboards; and
based on the determination that the user belongs to the class of users, identify the feature;
identify another widget that includes the identified feature; and
recommend the identified other widget that includes the identified feature to the user.

7. The apparatus as claimed in claim 2, wherein, to identify the widget-of-interest, the machine readable instructions that when executed by the processor further cause the processor to:
determine that the widget-of-interest is added to other user dashboards in a certain time period;
based on the determination that the widget-of-interest is added to the other user dashboards in the certain time period, select the widget-of-interest to recommend to other users; and
output a notification to recommend the widget-of-interest to the other users.

8. A non-transitory computer readable medium storing machine readable instructions that when executed by a processor cause the processor to:
identify data values in a first widget displayed on a first user dashboard;
substitute the data values in the first widget with other data values in a data set determine a difference between values of each of the substituted data values at different points in time; and
in response to a determination that the difference between the values of each of the substituted data values at the different points in time is within a pre-defined threshold, output a recommendation to add a second widget that graphically represents a relationship between the substituted data values in the first widget on the first user dashboard.

9. The non-transitory computer readable medium as claimed in claim 8, wherein the machine readable instructions further cause the processor to:

identify a first value displayed on the first widget of a first user at a first time;
identify a second value displayed on the first widget at a second time after the first time; and
in response to a determination that a difference between the displayed second value and the displayed first value is greater than the pre-defined threshold, output a notification to recommend to a second user to add the first widget to a second user dashboard.

10. The non-transitory computer readable medium as claimed in claim 9, wherein, to output the notification, the machine readable instructions further cause the processor to:
identify variables associated with the first user dashboard;
determine a plurality of relationships between the variables with respect to each other;
determine values corresponding to each of the plurality of relationships;
identify relationships from the plurality of relationships having changes in the values within the pre-defined threshold at the different points in time; and
based on the identified relationships, output the notification to recommend to the second user to add the first widget to the second user dashboard, the first widget being indicative of a first relationship from the identified relationships.

11. The non-transitory computer readable medium as claimed in claim 10, wherein the machine readable instructions that when executed by the processor further cause the processor to:
for each of the identified relationships having values that change at the different points in time and are within the pre-defined threshold, suggest an alternative widget representing the first relationship.

12. The non-transitory computer readable medium as claimed in claim 9, wherein the machine readable instructions further cause the processor to:
receive feedback from the second user regarding the recommendation to add the first widget to the second user dashboard;
determine, based on the feedback from the second user, a set of relationships among a plurality of relationships; and
output a notification for the first user to access other widgets based on the set of relationships.

13. The non-transitory computer readable medium as claimed in claim 12, wherein the machine readable instructions further cause the processor to:
identify widgets that represent relationships that correspond to the set of relationships determined based on the feedback received from the second user.

14. The non-transitory computer readable medium as claimed in claim 12, wherein the machine readable instructions further cause the processor to:
identify widgets that represent relationships that are identical to the set of relationships determined based on the received feedback.

15. A method comprising:
identifying, by a processor, data values in a first widget displayed on a first user dashboard of a first user;
substituting, by the processor, the data values in the first widget with other data values in a data set;
determining, by the processor, a difference between values of each of the substituted data values at different points in time; and
in response to a determination that the difference between the values of each of the substituted data values at the different points in time is within a pre-defined threshold, outputting, by the processor, a recommendation to add a second widget that graphically represents a relationship between the substituted data values in the first widget to the first user dashboard.

16. The method as claimed in claim 15, further comprising:
   selecting a third widget from a pool of widgets;
   identifying a data value displayed on the selected widget; and
   based on a determination that the data value displayed on the selected widget has changed over time by an amount greater than the pre-defined threshold, outputting a recommendation to add the selected widget to the first user dashboard.

17. The method as claimed in claim 16, wherein selecting the third widget includes selecting the third widget in response to a determination that a total number of times the third widget is added to user dashboards is greater than a predetermined number.

18. The method as claimed in claim 16, further comprising:
   determining that the selected widget is not added to the first user dashboard; and
   based on the determination that the selected widget is not added to the first user dashboard, classifying the selected widget in a category of widgets that were presented to the first user but not added to the first user dashboard.

19. The method as claimed in claim 16, further comprising:
   determining that the selected widget is not added to the first user dashboard; and
   based on the determination that the selected widget is not added to the first user dashboard, classifying the first user in a category of users who did not add the selected widget to their respective dashboards.

20. The method as claimed in claim 15, further comprising:
   based on the determination that the difference between the values of each of the substituted data values at the different points in time is within the pre-defined threshold, outputting a recommendation to add the second widget that represents the relationship between the substituted data values in the first widget to a second user to add to a second user dashboard.

* * * * *